United States Patent
Meyer-Gräfe et al.

(10) Patent No.: US 6,957,115 B1
(45) Date of Patent: Oct. 18, 2005

(54) SECURITY-RELATED BUS AUTOMATION SYSTEM

(75) Inventors: Karsten Meyer-Gräfe, Hövelhof (DE); Wolfram Kress, Siegburg (DE)

(73) Assignee: Phoenix Contact GmbH & Co., Blomberg (DE)

( * ) Notice: Subject to any disclaimer, the term of this patent is extended or adjusted under 35 U.S.C. 154(b) by 0 days.

(21) Appl. No.: 10/018,721

(22) PCT Filed: Jun. 16, 2000

(86) PCT No.: PCT/DE00/01901

§ 371 (c)(1),
(2), (4) Date: Apr. 22, 2002

(87) PCT Pub. No.: WO00/79352

PCT Pub. Date: Dec. 28, 2000

(30) Foreign Application Priority Data

Jun. 17, 1999 (DE) .......................... 199 27 635

(51) Int. Cl.[7] .............................................. G06F 19/00
(52) U.S. Cl. .......................... 700/108; 700/79; 370/216
(58) Field of Search ............................ 700/108, 79, 80, 700/177; 709/208–211; 710/100, 106–107, 110; 702/57–58, 183; 370/216; 714/47, 48, 56

(56) References Cited

U.S. PATENT DOCUMENTS

| 4,680,753 | A | * | 7/1987 | Fulton et al. ................ 370/449 |
| 5,063,527 | A | * | 11/1991 | Price et al. .................. 700/274 |
| 5,161,110 | A | * | 11/1992 | Dorchak ...................... 700/108 |
| 5,784,547 | A | * | 7/1998 | Dittmar et al. ................ 714/4 |
| 6,325,198 | B1 | * | 12/2001 | Pattantyus-Abraham et al. 198/339.1 |
| 6,385,562 | B1 | * | 5/2002 | Roth et al. ................... 702/188 |
| 6,466,539 | B1 | * | 10/2002 | Kramer et al. .............. 370/216 |
| 6,577,918 | B1 | * | 6/2003 | Roth .......................... 700/177 |

\* cited by examiner

*Primary Examiner*—Leo Picard
*Assistant Examiner*—Alexander Kosowski

(57) ABSTRACT

The invention relates to a safety-related automation system, and to a method for operating such a system. In order to provide a safety-related automation bus system which needs only a low level of hardware redundancy and can be flexibly matched to the respective requirements, the automation system comprises at least one safety analyzer, which is connected by means of an interface to the bus and monitors the data flow via the bus, the analyzer being set up for carrying out safety-related functions. The automation system is distinguished in that the standard control device drives at least one safety-related output, and the safety analyzer is designed for checking and/or for processing safety-related data in the bus datastream.

34 Claims, 5 Drawing Sheets

SECURITY-RELATED BUS AUTOMATION SYSTEM

Figure 1:
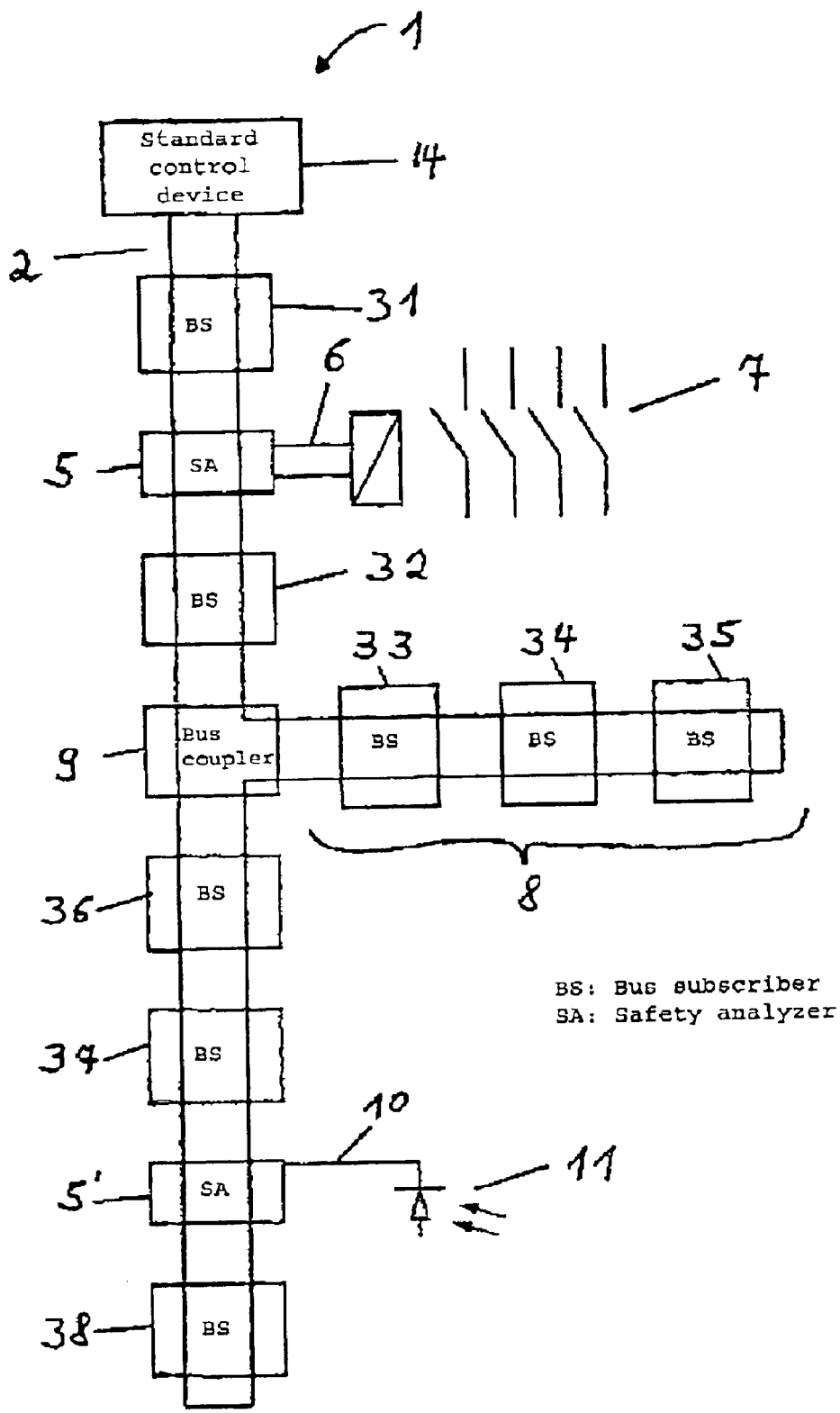

The invention relates to a safety-related automation bus system as claimed in the precharacterizing clause of claim 1, and to a method for operating such a system.

Control and data transmission systems have gained a dominant position not only in industrial manufacturing owing to the high level of automation that they make possible. Such automation systems generally have at least sections or components an which more stringent requirements with respect to safety may be placed. For example, it is necessary to ensure that certain machines are operated within predetermined operating parameters, or it is necessary to prevent a machine from running even though someone is located in its operating area. In this context, for example, a lathe must not exceed a predetermined rotation speed or there must not be anyone in the radius of action of a robot, when that robot is being operated. Furthermore, when operating an automation system, it is necessary to ensure that, if one component in the system fails, the system does not change to an undefined, and hence unpredictable, state.

On approach to this problem according to the prior art is, in particular, to use a number of channels for the safety-relevant components in the system, that is to say to design them to be redundant. For example, safety bus components, that is to say for example bus subscribers which are associated with a safety-relevant machine, may be duplicated in an automation bus system. At the same time, the central control and the bus may have a number of channels, or even a specific safety control system, which is separate from the process control system and in some circumstances is of redundant design, for controlling the safety-relevant components. This safety control system essentially carries out the logic links an the safety-related input information and then transmits, for example via an automation bus, safety-related logic linking data to output components. The output components themselves process the received safety measures and, if the test result is positive, output this to the peripherals. Furthermore, they switch their outputs to a safe state if they find a fault, or have no longer received any valid data within a predetermined time period.

The use of two control systems in the system, that is to say a process control system and the described safety control system, results in a number of disadvantages, however. Among other factors, the increasingly stringent requirements for the reaction time of automation systems means that such a system often has to be subdivided between safety islands. Furthermore, synchronization problems occur especially in multichannel control systems which, despite the system in principle being intact, can lead to failures or even to destruction of machine parts. Furthermore, the multichannel design results in an increase in the system and maintenance costs, due to the increased hardware complexity.

DE 198 15 150 A1 discloses a system which comprises an evaluation unit which is connected to the bus, continuously monitors the symbols transmitted via the bus system, and starts up a piece of equipment only when codings which are transmitted via the bus system are identified without any errors. To this end, the input data sent by the bus subscriber to the master is evaluated, and the piece of equipment is switched an or off in response to the evaluation.

Such an approach is not as costly as the system described first, but it is highly inflexible in terms of upgrading the system or matching the system to other bus components. Furthermore, the evaluation unit has sole responsibility for initiating a safety-based function, so that it is absolutely essential for the evaluation unit to be of redundant design in order to comply with stringent safety requirements.

One object of the invention is thus to provide a safety-related automation bus system which requires as little hardware redundancy as possible, and which can be flexibly matched to the respective requirements.

The invention solves this problem by means of an automation bus system having the features of claim 1 and a method for operating such a control and data processing system as claimed in claim 14. Developments of the invention are specified in the dependent claims.

According to the invention, the automation system comprises a bus system, sensor and actuator bus subscribers connected to it, and a standard control device which carries out the process control function with the processing of process-linked I/O data and safety-related control function with the processing of safety-related data, that is to say the control of safety-related inputs and outputs. It also includes what is referred to as a safety analyzer, which is connected to the bus by means of an appropriate interface and monitors the data flow via the bus, with the analyzer being set up to carry out safety-related functions. This relates, for example, to the actuation of a contractor for switching off the supply voltage to system components, or to the determination of the quality data. Such quality data may include general system parameters, for example data on the occurrence of faults in system components, or bus transmission errors. The automation system is distinguished by the fact that the standard control device drives at least one safety-related output via the bus, but it may itself have such a safety-related output. According to the invention, a safety-related output denotes a sink for safety information which starts safety-based sequences as a function of the information, for example slowing down a machine or even switching off a machine by interrupting the supply power. The safety analyzer in the automation system according to the invention is designed for checking and/or for processing safety-related data, in particular safety-related logic linking data, in the bus datastream. In this case, safety-related logic linking data, for example data which the safety-related control system sends to safety-related outputs after processing safety-related data.

A system is therefore provided which can be matched extremely flexibly to the respective requirements for the automation system. For example, each safety bus component may be allocated such a safety analyzer, and a safety analyzer may itself also be integrated in the safety component, for example a safety bus subscriber, although it is also possible for one individual safety analyzer to carry out the processing of safety-related data or the checking of safety-related logic linking data in the bus datastream for a number of safety bus components, or even for all the safety bus components in the system.

The principle of the invention is based in the inventor's experience on the fact that the electronics used in present-day automation systems themselves fail only rarely. The integration of the present-day digital safety technology in automation technology in the form of safety control systems or safety bus systems according to the prior art frequently have the disadvantage of decreasing the system availability. In order to reduce the down times, availability structures are therefore also used in addition to said safety components, but they themselves lead to a not inconsiderable increase in costs, due to the increased hardware complexity.

The invention is therefore based on the reliability of present-day automation systems, and integrates pure emergency electronics or software, which become actively involved in the operation of the system only when the standard technology is operating incorrectly. The standard control device therefore also processes safety-related data, that is to say it controls safety-relevant inputs and outputs. In particular, the safety-related logic linking data which is produced in the bus datastream is, however, monitored and checked by the safety analyzer. This has the advantage for the user that it is no longer absolutely necessary to maintain strict isolation between the circuit technology and the standard technology during programming. The automation system according to the invention can be used on all systems with a bus, in particular on bus systems using master-slave bus access methods. Independently of the arrangement of the safety analyzer in the long-distance bus section, this safety analyzer can read all the IN data on the bus, in, for example, a serial bus system in accordance with EN 50254, but the amount of OUT data which can be monitored depends on the arrangement of the safety analyzer in the system. The expression bus datastream in this case, according to the invention, refers to all the information that is transmitted via the bus, in particular including data transported via the bus in a sum frame.

In order to comply with the relevant safety requirements, the safety analyzer can initiate the necessary safety-related functions in response to the checking and/or the processing of safety-related data, in particular of logic linking data in the bus datastream. In this case, the safety analyzer can react not only to OUT data, that is to say logic linking data from the standard control device, but also to IN data, that is to say to information in the bus datastream, which has been sent from individual I/O bus subscribers to the standard control device.

In order to identify an error in safety-related logic linking data which is transported via the bus, the safety analyzer may have a fully programmable logic device, in which the monitored data, in particular the monitored safety-related data, is processed. In this way, by modeling the safety-related logic links of the standard control system, the safety analyzer can check the logic linking data of this control system sent as OUT data via the bus, and can carry out the necessary safety-related functions in response to the check or the comparison. In order, for example, to change the system to a safe state, the safety analyzer may have an output via which an assembly in particular a bus subscriber in the automation system, can be switched on or off. The switching-off process can be carried out by disconnection from the voltage supply. In order to change all the associated and mutually independent bus subscribers to a safe state, the safety analyzer may be set up for switching off a bus spur, a safety island comprising a number of mutually associated bus subscribers, or to switch off components on the basis of interlocking logic stored in the analyzer. However, it is also possible for the entire system to be disconnected from the voltage supply via the safety-related output of the safety analyzer.

In addition to monitoring the bus, the safety analyzer can also detect safety-related information via a direct input, by means of which the safety analyzer is connected to a safety-related device in the automation bus system. In this case, this device may be, but need not be, connected to the bus. By way of example, the safety-related information accessible in this way includes the instantaneous rotation speed of the lathe already mentioned, with the analyzer output switching off the machine if a predetermined limiting rotation speed is exceeded.

In order to separate the safety-related information and the process data in the system, and in particular in the control system, the bus system may be connected via an interface assembly to a host, with the process-related control of the standard control device being arranged in the host, and the safety-related control of the standard control device being arranged in the interface assembly. The safety-related control system may, for example, advantageously be in the form of software functional modules, which carry out the necessary logic links on the safety-relevant I/O Information.

The safety-related control system can thus be implemented in the same way as the process control system. When coding the safety-related logic links, the programmer is independent of the programming language being used, in the same way as with the process control system.

The logic links in the safety analyzer have approximately the same scope as the logic links in the host and in the interface assembly, and can be produced either in the same programming language, or else in a different one. The safety analyzer also carries out a comparison of the logic links between the results from the host system and/or the interface assembly and its own results, and starts safety-based functions, for example in the event of an inequality.

The acceptance procedure for such a system can be carried out considerably more easily than is the case with systems according to the prior art. The system can be started up with all the safety interlocks, without needing to switch the safety technology to be active. The necessary logic links are in this case located in the host system or in the interface assembly. The functionality of the system can be investigated first of all using a black-box test. In a second step, the safety technology is then connected, in the form of the safety analyzer or analyzers. Since only the safety logic links, but not the process data logic links, are present there, the white-box test can now be carried out quickly and clearly, thus allowing the acceptance times to be considerably reduced. Since the safety-related logic algorithms can also run on the host system and/or on the interface assembly, a comparison with those in the analyzer can be carried out quickly.

If the bus is a serial ring bus, for example a bus in accordance with EN 50254, and if a safety analyzer is arranged in the top-level long-distance bus section of the automation system, then this has access to all the IN data in the system since, in the system referred to, the data is carried in a forward transmission line and in a return transmission line by each bus subscriber. The analyzer is thus able to form a process map which is restricted to the IN data and the Out data to which it has access.

In bus systems with a linear topology, the safety analyzer can in general read all the information at any point in the bus system, and can thus produce a complete process map.

In one advantageous embodiment of the invention, the safety analyzer is arranged in a serial ring bus system directly after the host or the interface assembly, so that it can form a complete process map. The safety analyzer is thus able to check and to process safety-based data, in particular safety-based logic linking data, for its correctness at any time and fully, since, in this case, the analyzer has access to all the In and Out data, that is to say all the input and output data.

If the safety analyzer is arranged in the interface assembly of the described serial ring bus system, then the function of the safety analyzer can be carried out by means of a software component in the interface assembly. The interface assembly in this case advantageously has a safety-related output, in order to carry out appropriate safety-based functions, for example using a contactor to switch off a supply voltage.

However, in one particular advantageous embodiment of the invention, such safety-based functions can be carried out by direct data manipulation of the bus datastream by means of the safety analyzer. The manipulation includes rewriting, adding, insertion or substitution both of OUT data and of IN data in the bus datastream. If the process map is known, the safety analyzer can thus influence the operation of the automation system according to the invention in a far-reaching form, and can thus ensure that the system can be kept in defined states at any time. The principle of data manipulation can furthermore also be used in order to make available bus datastream components which are generally not accessible in a safety analyzer arranged in the bus spur, in that a safety analyzer which is arranged in the long-distance bus converts the relevant data to data which is transported in the relevant bus spur. This provides a direct data link between safety analyzers.

Data manipulation by means of a safety analyzer can also be used, in a bus system operating an the master-slave principle, in order to transmit data between at least two slaves, in particular between individual bus subscribers, by means of a point-to-point link via at least one safety analyzer, with the safety analyzer copying data in the bus datastream. Depending on the position of the two slaves in the bus system, the master is in some circumstances not included in this data link, so that the data transportation takes place completely independently of the bus master. Such a data link between two slaves is, apart from this, also possible when the bus master is carrying out a copying function. While, when a safety analyzer is acting as an agent, as described above, the bus master is not included in the data transportation, at least in certain situations, the bus master is absolutely essential for the second form of point-to-point link between two slaves.

The interchanging of data between at least two slaves, for example between individual bus subscribers, by means of a point-to-point link can, furthermore, also be provided by including the master or the control system in the transmission, with the master or the control system in this case copying the data in the bus datastream.

In order to improve the data security, the safety-related data can also be transmitted via the bus using a security protocol. For example, the security protocol may include not only the safety data item but also the negated safety data item, a sequential number, an address and/or data protection information (CRC).

The flexibility of the system is evident in particular in a further advantageous embodiment of the invention, in which the automation system according to the invention has a number of safety analyzers, with safety-related logic links that are carried out in one safety analyzer being carried out in redundant form in at least one further safety analyzer, and the same safety functions being carried out and initiated, at least partially, by both safety analyzers. In this case, the relevant safety analyzers can also carry out different safety-related logic links in addition to the redundant logic links, that is to say those which are carried out on both analyzers.

Figure 2:
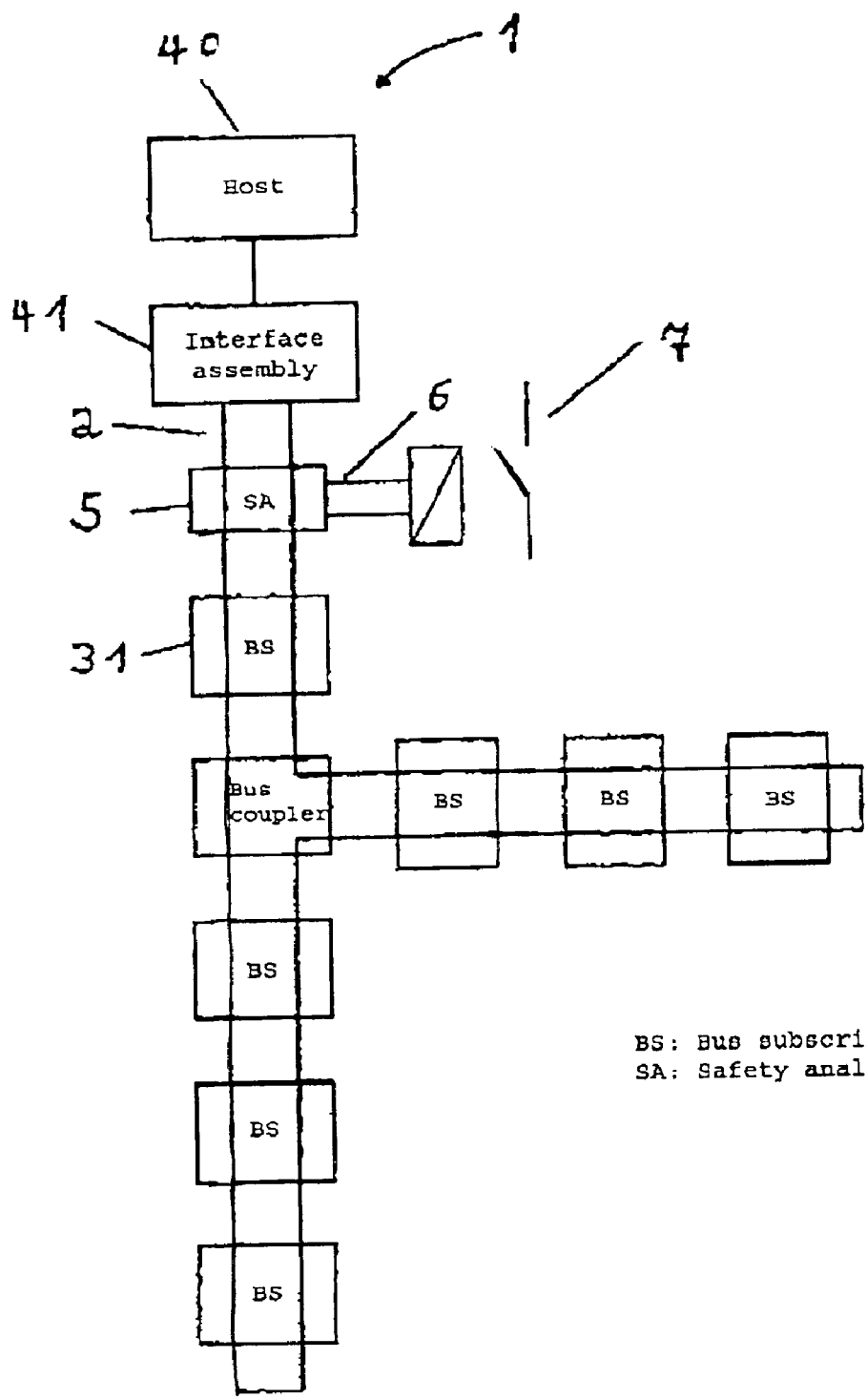
Figure 3:
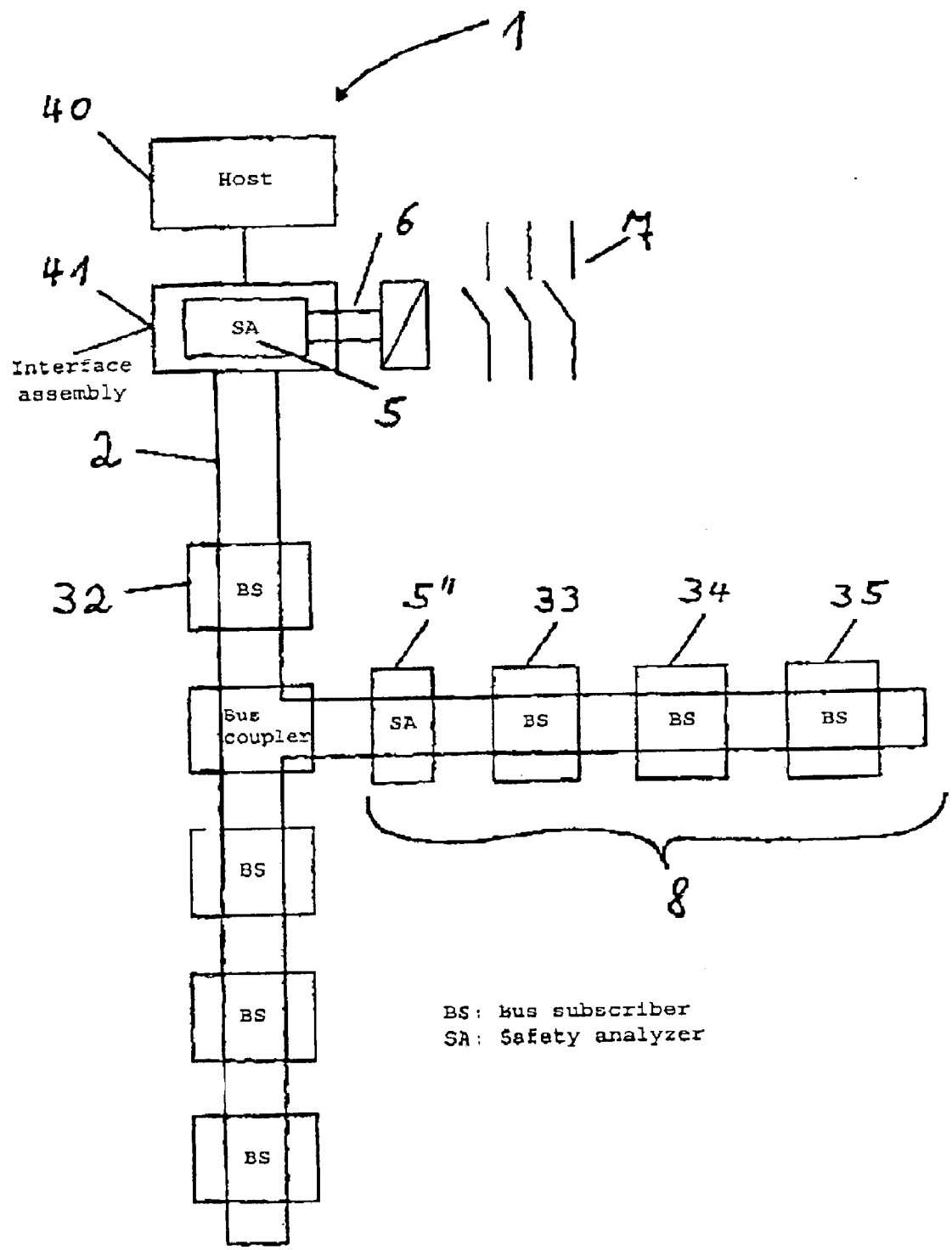
Figure 4:
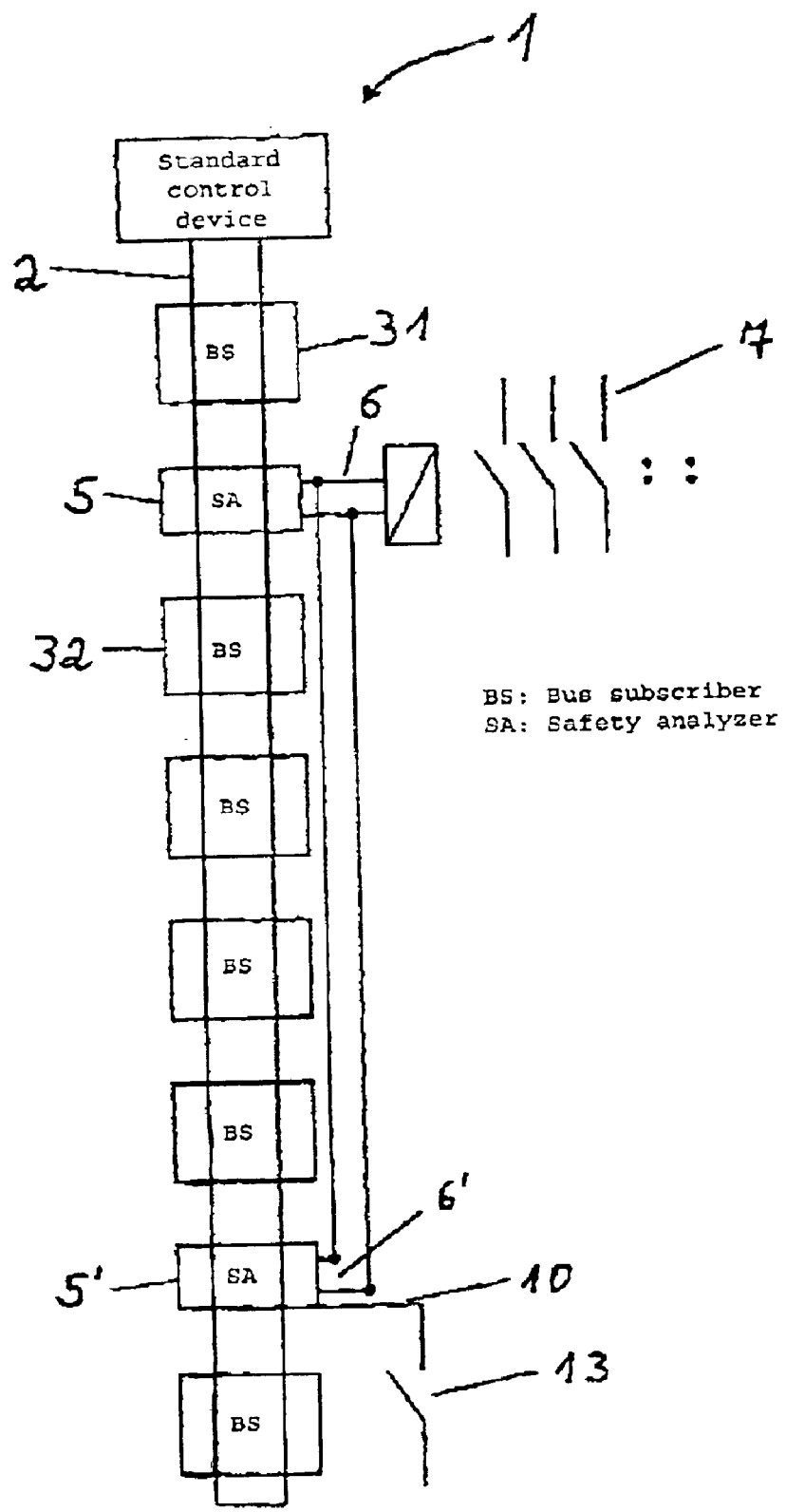
Figure 5:
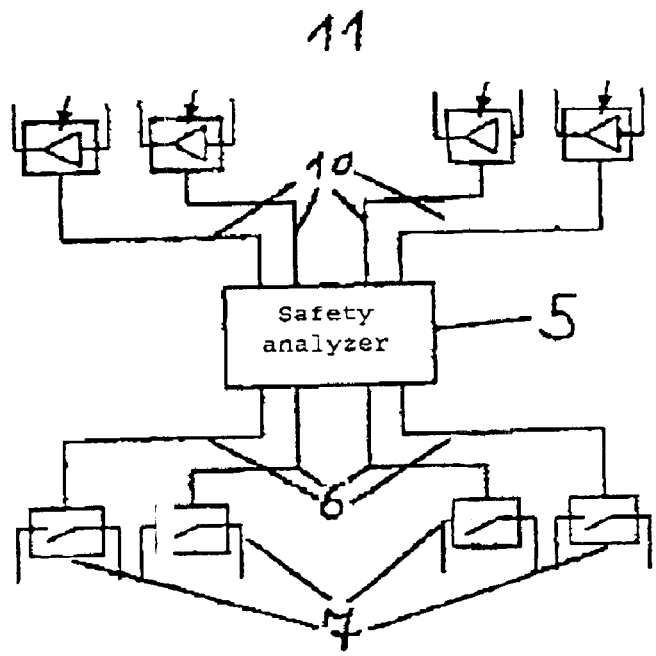

The invention will be explained in the following text by describing a number of embodiments based on the drawings, in which:

FIG. 1 shows an outline illustration of a first embodiment of the automation system according to the invention, with two safety analyzers in the long-distance bus system, FIG. 2 shows an outline sketch of a further embodiment of the invention, with a safety analyzer being arranged directly after the interface assembly, FIG. 3 shows the automation system according to the invention in the form of an outline sketch with a safety analyzer integrated in the interface assembly, and with a second safety analyzer at the head of a bus spur, FIG. 4 shows an automation system according to the invention with two safety analyzers whose outputs are connected to one another, FIG. 5 shows an outline block diagram illustration of a safety analyzer with various inputs and outputs, and FIGS. 6a and 6b show an outline illustration of data manipulation on the bus datastream by means of the safety analyzer.

FIG. 1 shows an outline illustration of the automation system 1 according to the invention, that is to say a control and data transmission system according to the invention. This has a bus 2 to which I/O bus subscribers with associated sensors and actuators are connected. A standard control device 4 uses the bus for process control, processing process-linked I/O data. To do this, the controller 4 receives data from the individual bus subscribers 31–38, which in turn themselves receive data from the standard control device. Furthermore, the standard control device deals with the processing of safety-related data. In this sense, the standard control device carries out not only the process-linked inputs and outputs but also the processing of the safety-relevant inputs and outputs. According to the invention, a safety-related input denotes an information source, with the information emitted by the source being related to some way to the safety of the automation system according to the invention. By way of example, one such safety-related input is the rotation speed sensor of a lathe which is connected to the bus 2 via a bus subscriber 32, since the machine must not rotate at a speed above a predetermined limit. A further example of a safety-related input in the described embodiment of the invention is a photodetector of a light barrier, which is used to monitor the operating area of the lathe. In this case as well, the standard control device has access via the bus to the information at the safety-related input. After processing the safety-related data, for example in the form of a logic link, the control device 4 sends this safety-related logic linking data to safety-related outputs. By way of example, the standard control device may send a switch-off command for said lathe via the bus to the associated bus subscriber 32 when the maximum rotation speed has been exceeded and there is thus a risk of the system running out of control. In this case as well, the safety-related controller in the standard control device communicates via the bus with the safety-related output.

The automation system according to the invention also has two safety analyzers 5, 5', each of which monitors the data flow via the bus system in real time by means of an interface. The safety analyzers are set for logic linking and/or processing of safety-related data in the bus datastream. This means that they can deal with the safety-related logic links of the standard control device, since they can access the safety-related data transported via the bus.

To this end, the safety analyzers 5, 5' each have a freely programmable logic device in which the monitored data, in particular the monitored safety-related data, is processed. By way of example, the safety analyzers 5, 5' can model the safety-related logic links of the standard control system to check their logic linking data sent via the bus as output data. In the present case, the safety-related logic links relate to an individual bus subscriber 32. In this case, the safety analyzer 5 is responsible for the safety-related inputs and outputs which are associated with this bus subscriber. In the embodiment of the invention illustrated in FIG. 1, the safety analyzers 5 and 5' are not logical bus subscribers in the automation system. However, the safety analyzer 5 has a safety-related output 6 via which the bus subscriber 32 associated with the safety analyzer can be switched off. This is done by means of a circuit of a contactor 7, which disconnects the bus subscriber and the connected assemblies and machines from the supply voltage. In this way, the safety analyzer 5 carries out a safety-related function in response to the check or the comparison, in this case switching off the supply voltage. If, for example, a fault is identified in the safety-related logic linking data from the standard control device, the safety analyzer can switch off the relevant bus subscriber via the described output, since the safety-related controller provided by the standard control device is no longer operating correctly. In a similar way, a bus subscriber is switched off if the safety-related controller does not send the required data to that bus subscriber and, in consequence, there is a risk of the system changing to an undefined state.

In the described embodiment, a local bus spur 8 with three bus subscribers 33, 34 and 35 is arranged via a bus coupler 9. These bus subscribers are dependent on the functionality and on the operation of the bus subscriber 32, which is associated with the safety analyzer 5. It is therefore necessary, when the bus subscriber 32 is switched off, for the bus subscribers on the local bus spur 8 to be disconnected from the supply voltage, as well. This interlocking logic is stored in the safety analyzer 5. A total of four bus subscribers must therefore be switched off, together with their subordinate assemblies and machines, as is illustrated schematically in FIG. 1 by means of a quadruple contactor 7.

Figure 6:
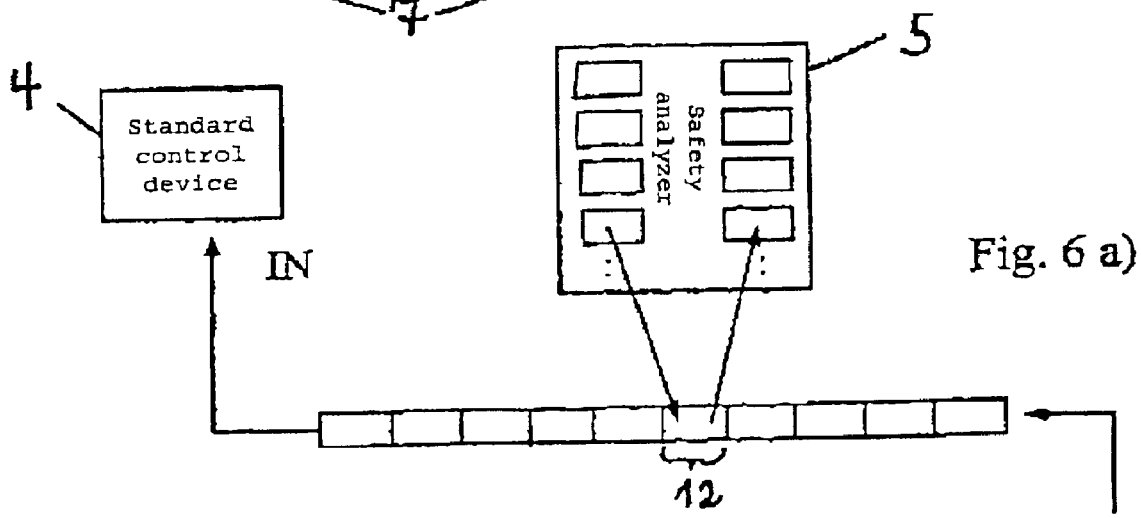
Figure 6:
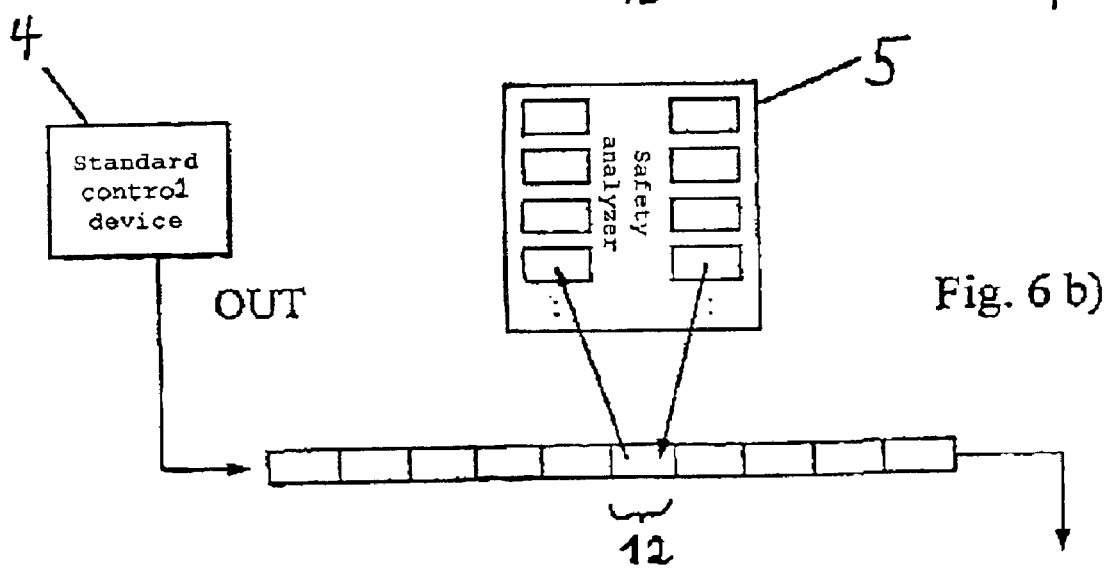

The safety analyzer 5, like the first safety analyzer 5, is set up for monitoring the data transported via the bus. However, in contrast to the first safety analyzer 5, it does not have an input by means of which it can carry out safety-related functions. Instead of this, it has a safety-related input 10, via which the safety analyzer is connected to a safety-related device 11 in the automation system for detecting safety-related data. In the present case, this device 11 has a photodetector which, as part of a light barrier monitors the operating area of a welding robot. The sensor is not connected to the automation bus by means of a bus subscriber, but is connected directly to the safety analyzer 5. In response to the safety-related data detected via the safety-related input 10 of the safety analyzer 5, the safety analyzer in this case also carries out a safety-related function. If the photodetector 11 detects that someone has entered the operating area of the robot, then the safety analyzer 5' automatically switches off the corresponding bus subscriber 38 and its associated assemblies, and the robot. To do this, the safety analyzer 5' has a device for manipulating the input and output data transmitted to the bus. In this case, at least one data item in the datastream can be overwritten, deleted and/or at least one data item can be inserted into the bus datastream. Such a procedure is shown in FIGS. 6a and 6. These FIGS. show the amendment of input and output data for the standard control device 4 by the safety analyzer 5'. In both cases, an information unit 12 is read to a memory in the safety analyzer, and an information unit taken from another memory in the safety analyzer is then written to the corresponding point in the datastream. The bus subscriber and the assemblies connected to it, and hence the robot, can be switched off both via the manipulation of the input data and via the manipulation of the output data of the standard control device. If, for example, the input datastream is amended such that the standard control device 4 is told that there is an operating parameter outside the predetermined limits, then the standard control device switches off this bus subscriber, and hence the welding robot, via the bus by means of a safety-related logic linking data item transmitted to that specific bus subscriber 38. In the same way, the safety analyzer can cancel enabling by the standard control device, by overwriting the appropriate output data item.

FIG. 6b shows the situation in which the safety analyzer amends the output datastream on the bus. In this situation, the safety analyzer manipulates the data sent to the bus subscriber 38 such that the bus subscriber switches off its output, and hence the welding robot as well.

FIG. 2 shows a further embodiment of the invention. In this case, the bus is a system operating on the master-slave principle, with the standard control device acting as the master, and the individual bus subscribers acting as slaves. The bus system is connected via an interface assembly 41 to a host 40, with the process-related control system being arranged and running in the host, and the safety-related control system being arranged and running in the interface assembly. The system has a single safety analyzer 5, which is coupled to the bus directly after the interface assembly, in order to monitor the bus datastream. This measure ensures that the safety analyzer can monitor the entire input datastream as well as the entire output datastream on the bus, when connected to a serial bus with a ring structure. The safety analyzer 5 uses the knowledge of the entire datastream via the bus to store the complete process map in a memory provided for this purpose, in the described embodiment. In consequence, the safety analyzer is able to check all the safety-related logic linking data for the safety-related control system in the interface assembly and, if necessary, that is to say when a fault occurs, to drive the output 6 to switch the entire system off by means of the contactor 7 on a safety basis, such that the supply voltage is switched off for the entire system.

The automation system according to the invention in FIG. 3 shows a modification of the embodiment illustrated in FIG. 2. In this case, the safety analyzer 5 is integrated in the interface assembly 41. The safety-related control of the standard control device and the safety-related data processing in the safety analyzer run in separate and independent logic modules in the interface assembly. Furthermore, a second safety analyzer 5' is arranged at the head of the local bus spur 8. This arrangement is in turn dependent on the safety analyzer 5' being able to monitor all the input data and output data for the subscribers 33, 34 and 35 on the local bus spur 8 and, accordingly, of being able to apply a complete process map for the process sequence within the local bus spur. Like the safety analyzer 5 in the long-distance bus section, the safety analyzer 5' is thus able to check all the safety-related logic linking data for the safety-related control system for the local bus section in the interface assembly and, if necessary and as described above, to initiate the necessary safety-related functions by data manipulation. This allows very stringent safety requirements which are placed on the safety-relevant inputs and outputs applicable to the bus spur 8 to be satisfied, since the local bus spur 8 is protected not only by the safety-related control of the standard control device, but also by the safety analyzer 5 and by the safety analyzer 5".

FIG. 4 shows a further embodiment of the invention. The automation system according to the invention has two safety analyzers 5 and 5', whose safety-related outputs 6 and 6' are coupled to one another. Both outputs control a multiple contactor device 7 for switching off the supply voltage for the entire system. The system is controlled via a standard control device 4 via the serial bus 2. Since it is arranged in the system, the safety analyzer 5 can monitor all the input and output data on the bus, except for the input data for the first bus subscriber 31, which is arranged between the control device 4 and the safety analyzer 5. The safety analyzer 5' can monitor all the input data on the bus, but none of the output data except for that for the last bus subscriber is accessible to it. By copying the relevant data in the bus data flow, the first safety analyzer 5 is therefore able to copy the output data accessible to it into input data and thus to make available to the safety analyzer 5' as well the output data, which is actually not accessible to said safety analyzer 5', for application of a process map for the safety-related bus subscriber 32 to be protected. Since both safety analyzers receive the same input information, they can monitor the safety-related inputs and outputs of the bus subscriber 32 to be protected. This provides distributed redundancy for the safety technology in the automation system according to the invention. In the present example, the safety analyzer 5' also has a safety-related input 10, to which an emergency switch 13 is connected. When the emergency switch 13 is closed, the safety analyzer 5' responds with the associated safety-related function in the safety analyzer, namely the opening of the contactor 7 in order to switch off the entire system.

The described method for copying input data into output data, and vice versa, is also used, according to the invention, to provide a data link between two slaves in the automation system operating an the master-slave principle, without the master being required for data transmission. In this case, for example, a safety analyzer which is associated with one bus subscriber can insert the data item to be transmitted for the bus subscriber into the input datastream, and thus make it available to a downstream bus subscriber, without involving the master. In this way, if required, information can be multicast or broadcast in a simple manner to all the other downstream bus subscribers.

In one embodiment of the invention, which is not illustrated, the safety analyzer is integrated in an associated safety-based bus subscriber. The safety-based logic links are in this case provided in a logic unit in the bus subscriber, so that intelligence installed in the bus subscriber can be used for the safety-based logic links. Since the bus subscriber has a bus interface, this considerably reduces the additional hardware complexity for the safety analyzer.

At least in some cases, the safety-related data is transmitted via the bus using a security protocol for data transmission in the described automation systems according to the invention. Depending on the requirement, this security protocol may include, in addition to the safety data item, the negated safety data item, and an address and/or data protection information in the form of a CRC. This allows errors during data transmission to be identified easily. For this purpose, a safety analyzer which is used in the automation system according to the invention is set up such that it can read the security protocol, and can evaluate it appropriately.

The address of the safety bus subscriber transmitted in the security protocol allows the safety analyzer to adapt the programming, to identify the data set of the subscriber associated with it, and to take account of the change in the bus layout when the bus layout is changed, for example as a result of the component being switched off for safety reasons. In addition, the inclusion of the address in the security protocol allows a storage error caused by a bus fault or a failure in the decentralized unit to be detected.

One particular embodiment of a safety analyzer for use in the automation system according to the invention is shown in FIG. 5. The illustrated safety analyzer 5 has not only four safety-based inputs 10 for detecting safety-based information from photodetectors 11, but also four safety-based outputs 6 for disconnecting the supply voltage from four automation bus components by means of contactors. The various safety-based outputs 6 are in this case driven in response to the logic links being produced in the safety analyzer, in response to the comparison with safety-based logic links in the standard control system, and/or in response to safety-related input information, via the input 10. In this case, interlock logic is stored in the safety analyzer, governing which safety-based functions are initiated when a specific fault or error occurs, that is to say which components must be disconnected from the supply voltage when that fault or error occurs.

It is within the scope of the invention for a safety analyzer to carry out process data processing in addition to processing safety-related data.

It should furthermore be stated that the principle of the invention is not restricted to the automation bus systems described in the exemplary embodiments but, in fact, can be applied to all automation systems having a bus.

What is claimed is:

1. An automation system, comprising at least
   a bus,
   I/O bus subscribers connected to the bus,
   a standard control device,
   at least one safety analyzer which is connected to the bus separately by means of an appropriate interface, monitors the data flow via the bus system and is designed to carry out at least one safety-related function,
   wherein the safety analyzer is set up for checking and processing safety-related data in the bus datastream and has a device for manipulating the datastream transmitted on the bus and
   wherein the safety analyzer is not a logic bus subscriber in the automation system.

2. The automation system as claimed in claim 1,
   wherein the standard control device controls at least one safety-related output.

3. The automation system as claimed in claim 1,
   wherein the safety analyzer has a freely programmable logic device, which processes the monitored safety-related data.

4. The automation system as claimed in claim 1,
   wherein the safety analyzer has at least one safety-related output via which at least one bus subscriber, which is associated with the safety analyzer of the automation system can be switched on or off.

5. The automation system as claimed in claim 4,
   wherein the safety analyzer is set up for switching off at least one of a safety island, a bus spur, and the entire automation system.

6. The automation system as claimed in claim 1,
   wherein the safety analyzer has at least one safety-related input, via which the safety analyzer is connected to a safety-related device in the automation system for detecting safety-related data.

7. The automation system as claimed in claim 1,
   wherein the bus is connected via an interface assembly to a host, with the process-related control being arranged in the host, and the safety-related control being arranged in the interface assembly.

8. The automation system as claimed in claim 1,
   wherein the bus is a serial bus, and at least one safety analyzer is arranged in a long-distance bus section of the automation system.

9. The automation system as claimed in claim 7,
   wherein a safety analyzer is one of arranged directly after the host or arranged after the interface assembly.

10. The automation system as claimed in claim 7, wherein a safety analyzer is arranged in the interface assembly.

11. The automation system as claimed in claim 1, wherein the safety analyzer comprises a memory device for storing a process map.

12. The automation system as claimed in claim 1 wherein the safety analyzer has a device for manipulating at least one of input data and output data transmitted on the bus.

13. The automation system as claimed in claim 12, wherein the device overwrites at least one of the input and output data in the safety analyzer.

14. The automation system as claimed in claim 12, wherein the device inserts data into the datastream.

15. The automation system as claimed in claim 1, wherein at least one safety analyzer is of redundant design.

16. A method for operating an automation system having a bus, comprising the following steps:
using a standard control device for carrying out a process control with the processing of process-linked I/O data and safety-related data, and
carrying out processing of safety-related data in at least one safety analyzer, which is not a logic bus subscriber in the automation system, with safety-related logic linking data in a bus datastream being processed in the safety analyzer,
wherein at least one step selected from a group consisting of overwriting at least one data item in the bus datastream, deleting at least one data item in the bus datastream and inserting at least one data item into the bus datastream is performed by the at least one safety analyzer by means of a device for manipulating a datastream on a bus.

17. The method as claimed in claim 16, further comprising the step of using the standard control device to control at least one safety-related output.

18. The method as claimed in claim 16, further comprising the step of comparing the safety-related logic linking data, which is transmitted via the bus, for at least one of the standard control device and at least one further safety analyzer with the corresponding logic linking data of the first safety analyzer, in a safety analyzer.

19. The method as claimed claim 16, further comprising the step of checking the logic linking data, which is produced by the standard control and is sent as output data via the bus in at least one safety analyzer by modeling the safety-related logic links of the standard control.

20. The method as claimed in claim 18, further comprising carrying out safety-related functions in response to the comparison by the safety analyzer.

21. The method as claimed in claim 19, further comprising carrying out safety-related functions in response to the checking by the safety analyzer.

22. The method as claimed in claim 16, further comprising the step of carrying-out a safety-related function via a safety-related output of the safety analyzer.

23. The method as claimed in claim 16, further comprising the step of using the safety analyzer to carry out safety-related functions in response to the safety-related data detected via the safety-related input of the safety analyzer.

24. The method as claimed in claim 23, wherein the process of carrying out the safety-related function comprises switching a bus subscriber on or off.

25. The method as claimed in claim 16, wherein the safety analyzer at least partially stores the monitored datastream and copies input data in the bus datastreams to output data in the bus datastream, and vice versa.

26. The method as claimed in claim 16, wherein safety-related data is transmitted via the bus using a security protocol.

27. The method as claimed in claim 26, wherein in addition to a safety data item, the security protocol comprises at least one of a negated safety data item, a sequential number, an address and data protection information (CRC).

28. The method as claimed in claim 16, wherein the bus is a system operating on the master-slave principle, with data being transmitted between at least two slaves, by means of a data link via at least one safety analyzer, with the safety analyzer copying data in the bus datastream.

29. The method as claimed in claim 28, wherein the data is transmitted between individual bus subscribers.

30. The method as claimed in claim 16, wherein the bus is a system operating on the master-slave principle, with data being transmitted between at least two slaves by means of a data link via the control or the master, with the control or the master copying data in the bus datastream.

31. The method as claimed in claim 30, wherein the data is transmitted between individual bus subscribers.

32. The method as claimed in claim 16, wherein at least one of quality data is produced by means of a safety analyzer, and the data which has been read is prepared for further processing.

33. The method as claimed in of claim 16, wherein the safety-related logic links used in a safety analyzer are at least partially carried out in redundant form in at least one further safety analyzer, and the same safety functions are at least partially carried out by the two safety analyzers.

34. The method as claimed in of claim 16, wherein a safety analyzer also at least partially carries out process data processing.

* * * * *